(12) United States Patent
Saunders (10) Patent No.: US 10,173,790 B2
(45) Date of Patent: Jan. 8, 2019

(54) FUEL PUMP ARRANGEMENTS

(71) Applicant: EATON LIMITED, Titchfield Hampshire (GB)

(72) Inventor: Kevin Michael Saunders, Gosport (GB)

(73) Assignee: EATON INTELLIGENT POWER LIMITED, Dublin (IE)

( * ) Notice: Subject to any disclaimer, the term of this patent is extended or adjusted under 35 U.S.C. 154(b) by 168 days.

(21) Appl. No.: 15/036,420

(22) PCT Filed: Nov. 12, 2014

(86) PCT No.: PCT/EP2014/074414

§ 371 (c)(1),
(2) Date: May 13, 2016

(87) PCT Pub. No.: WO2015/071333

PCT Pub. Date: May 21, 2015

(65) Prior Publication Data

US 2016/0257431 A1 Sep. 8, 2016

(30) Foreign Application Priority Data

Nov. 13, 2013 (GB) .................................. 1320035.7

(51) Int. Cl.
*B67D 7/70* (2010.01)
*B64F 5/00* (2017.01)
*F02M 37/10* (2006.01)
*B64D 37/00* (2006.01)
*F02C 7/236* (2006.01)
(Continued)

(52) U.S. Cl.
CPC .......... *B64F 5/0081* (2013.01); *B64D 37/005* (2013.01); *B64F 5/40* (2017.01); *F02C 7/236* (2013.01); *F02M 37/103* (2013.01); *F16K 1/20* (2013.01); *F02M 37/0076* (2013.01); *F05D 2220/323* (2013.01)

(58) Field of Classification Search
CPC .... F02M 37/103; F02M 37/18; B64F 5/0081; Y10T 137/86131; Y10T 137/86163
USPC ......... 137/544, 549, 565.24, 565.29, 565.31, 137/565.33, 855; 123/495, 497, 506, 123/509; 210/172.3, 172.4
See application file for complete search history.

(56) References Cited

U.S. PATENT DOCUMENTS 3,163,116 A 12/1964 McCourty et al.
3,539,272 A 11/1970 Howard et al.
(Continued)

FOREIGN PATENT DOCUMENTS

GB 373349 A 5/1932
RU 2439361 C2 1/2012

*Primary Examiner* — Reinaldo Sanchez-Medina
(74) *Attorney, Agent, or Firm* — Leydig, Voit & Mayer, Ltd.

(57) ABSTRACT

A fuel pump arrangement has multiple fuel pumps for fitting to aircraft fuel tanks and allowing maintenance of the pumps without requiring access from inside the tanks, particularly one having a housing with two fuel pumps for mounting in or adjacent a single aperture in the wall of a fuel tank, each pump being individually removable from the housing by withdrawal away from the tank. A sleeve is moveable also in the same direction as the pump to obstruct inlets in the housing and isolate the housing from the fuel in the tank so the tank need not be drained.

17 Claims, 9 Drawing Sheets

(51) Int. Cl.
*F16K 1/20* (2006.01)
*B64F 5/40* (2017.01)
*F02M 37/00* (2006.01)

(56) References Cited

U.S. PATENT DOCUMENTS

| | | | | |
|---|---|---|---|---|
| 4,781,527 A | * | 11/1988 | Miller | F04D 29/608 |
| | | | | 222/333 |
| 5,623,907 A | | 4/1997 | Cotton et al. | |
| 5,848,615 A | * | 12/1998 | Conti | F04B 53/1042 |
| | | | | 137/856 |
| 6,675,778 B1 | | 1/2004 | Kemper et al. | |
| 7,625,037 B2 | | 12/2009 | Gollehur et al. | |
| 8,240,332 B1 | | 8/2012 | Matusek et al. | |
| 8,261,722 B2 | | 9/2012 | Froehlich et al. | |
| 8,453,622 B2 | * | 6/2013 | Iwaoka | F02M 37/0017 |
| | | | | 123/509 |
| 2006/0065246 A1 | * | 3/2006 | Zdroik | B01D 35/0273 |
| | | | | 123/497 |
| 2011/0011373 A1 | * | 1/2011 | Shimura | F02D 41/3082 |
| | | | | 123/497 |
| 2011/0206497 A1 | | 8/2011 | Pasquesi et al. | |
| 2014/0127066 A1 | * | 5/2014 | Weckerly | F04B 49/03 |
| | | | | 417/533 |

* cited by examiner

Fig 8

FUEL PUMP ARRANGEMENTS

CROSS-REFERENCE TO RELATED APPLICATIONS

This application is a U.S. national stage application under 35 U.S.C. § 371 of International Application No. PCT/EP2014/074414 filed on Nov. 12, 2014, and claims benefit to British Patent Application No. 1 320 035.7, filed on Nov. 13, 2013. The International Application was published in English on May 21, 2015, as WO 2015/071333 A2 under PCT Article 21(2).

FIELD

This invention relates to fuel pump arrangements particularly but not exclusively arrangements including multiple fuel pumps for fitting to fuel tanks and allowing maintenance of said pumps, without requiring access to the interior of the tanks.

BACKGROUND

Fuel pumps, for example those used in commercial aircraft, are often mounted on or in the fuel tank. If fitted in the fuel tank, each pump requires an aperture in the tank, which is a potential leakage point, for example, where high altitude differential pressures are present. Where multiple pumps are required, for example to increase flow rates or to enable fuel transfer between tanks, then multiple apertures are then needed. As well as an increased risk of leakage, each aperture produced increases costs and weakens the fuel tank.

The use of multiple pumps increases the desirability for ease of pump maintenance. A simple means for isolating the fuel tank and then withdrawing the pumps is needed. It is often difficult to remove the pumps for maintenance. Having a housing which allows complete dismantling of the wearable parts of the pump arrangement, from outside the fuel tank ameliorates the problem of maintenance, because it allows access from the outside of a fuel tank and there is no need to completely drain and purge the fuel tank for an engineer to access the fuel tank.

SUMMARY

An aspect of the invention provides a fuel pump arrangement, comprising: a housing including two or more fuel pumps configured to mount in or adjacent an aperture in a wall of a fuel tank, wherein each pump is individually removable from the housing, from outside the fuel tank.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

According to a first aspect the invention provides a fuel pump arrangement, comprising a housing including two or more fuel pumps for mounting in or adjacent an aperture in the wall of a fuel tank, each pump being individually removable from the housing, from outside the fuel tank.

In an embodiment, the housing comprises two side by side cavities each for housing a fuel pump, and each having an axis extending generally perpendicular or obliquely to the tank wall.

In an embodiment, each cavity includes one or more fuel inlets which feed the respective pump.

Preferably, each cavity includes an outlet including a non-return valve.

In an embodiment, said non-return valves each include a flap and flap plate supporting the flap on the housing. Said plate may be held in place by a removable fixing and is rotatable for dismantling when said fixing is removed. In one instance said fixing is a single fixing, for example a single screw.

In an embodiment, said non-return valves are each withdrawable from their respective cavity by means of access from the respective cavity once the respective pump has been removed.

In an embodiment, each cavity includes a closure member associated with the housing, movable to isolate said cavity from said tank when said pump is removed from said housing.

Conveniently, said closure member comprises a sleeve including a sleeve aperture or apertures, in use substantially coinciding with said inlet or inlets, said sleeve being repositionable along said axis in use when said fuel pump is removed from said housing, such that said sleeve obstructs said inlet(s) to cause said isolation.

In an embodiment, the housing has a flanged base portion for securing to, or adjacent the fuel tank wall, said flanged portion substantially surrounding the two side by side cavities each for housing one of the two fuel pumps, said cavities being accessible in use from outside of the fuel tank, and allowing the withdrawal of the respective pump from outside the fuel tank.

In an embodiment, the housing is manufactured at least in part from fiber reinforced plastics material. The plastics material may be PEEK that is reinforced with around 20% to 35% carbon fibers.

In an embodiment, the housing further includes a mesh strainer formed around the inlet(s) externally of the housing. For saving weight, the strainer may be bonded to the plastics of the housing.

In an embodiment, the housing is adhesively bonded or bondable directly to the fuel tank or a fuel tank supporting structure.

In an embodiment, the arrangement may further include one or more vapor discharge valves located in said housing.

In an embodiment, the vapor discharge valves are removable from within each cavity when the pump is removed from the cavity.

According to a further aspect, the invention provides a method of servicing a fuel pump arrangement at least partially within a fuel tank, comprising, in any suitable order, the steps of:
a) providing a fuel pump arrangement as claimed in any one of the preceding claims;
b) partially withdrawing the fuel pump from the cavity of the arrangement together with the closure member of the arrangement;
c) withdrawing the pump fully from the cavity leaving the closure member to isolate the cavity from the fuel tank; and optionally
d) draining the fuel tank then removing any one or more of the fuel pump arrangement parts including the closure member, non-return valve and vapor discharge valves, from the tank and cavity by means of access to the cavity from the outside of the tank.

According to a second aspect of the invention, there is provided a fuel pump arrangement comprising a housing for at least partial insertion into a fuel tank and for supporting the arrangement adjacent a wall of the fuel tank, the housing including a fuel pump within the housing fed via an inlet or inlets in the housing, the fuel pump being withdrawable from the housing in a direction away from the tank and the arrangement further including a closure member moveable in the same direction as the pump during its withdrawal, said closure member when moved closing said inlet or inlets.

In an embodiment, the housing comprises also an exit including a non-return valve.

According to a third aspect of the invention, there is provided a fuel pump arrangement for being mounted in use internally of a fuel tank around an aperture in an external wall of the fuel tank which allows access to the arrangement from outside the fuel tank, said arrangement comprising a housing having an interface for being sealingly attached to the fuel tank in use around said aperture, said housing including a plurality of pump cavities, each cavity having inlet communicating with the interior of the fuel tank in use and removably receiving a fuel pump operable to draw fuel into the cavity via said inlet and to discharge it from the cavity, and each cavity having a respective closure element operable to close said inlet to isolate the respective cavity from said fuel tank.

In an embodiment, said cavities are formed integrally in said housing.

Alternatively, wherein said housing is made up of a plurality of housing components including respective cavity housing components.

Preferably, said housing includes a common outlet which receives in use fuel discharged from any of the pump cavities.

In an embodiment, each cavity includes a respective outlet.

In an embodiment, said cavities are accessible externally of the fuel tank when said pumps are removed.

According to a fourth aspect of the invention, there is provided a fuel pump arrangement comprising a housing for at least partial insertion into a fuel tank and for supporting the arrangement adjacent a wall of the fuel tank, the housing including at least one cavity, and comprising a fuel pump within the or each cavity fed via an inlet or inlets in the housing, the or each fuel pump being withdrawable from the cavity or cavities in a direction away from the tank and the arrangement further including a closure member within the or each cavity for closing said inlet or inlets when moved, the or each cavity further including a non-return valve, said closure member(s) and/or said non-return valve(s) being withdrawable from the cavity after withdrawal of the pump.

The invention extends to a fuel pump, which may be a single fuel pump, having the features mentioned above or those described and illustrated.

Figure 1:
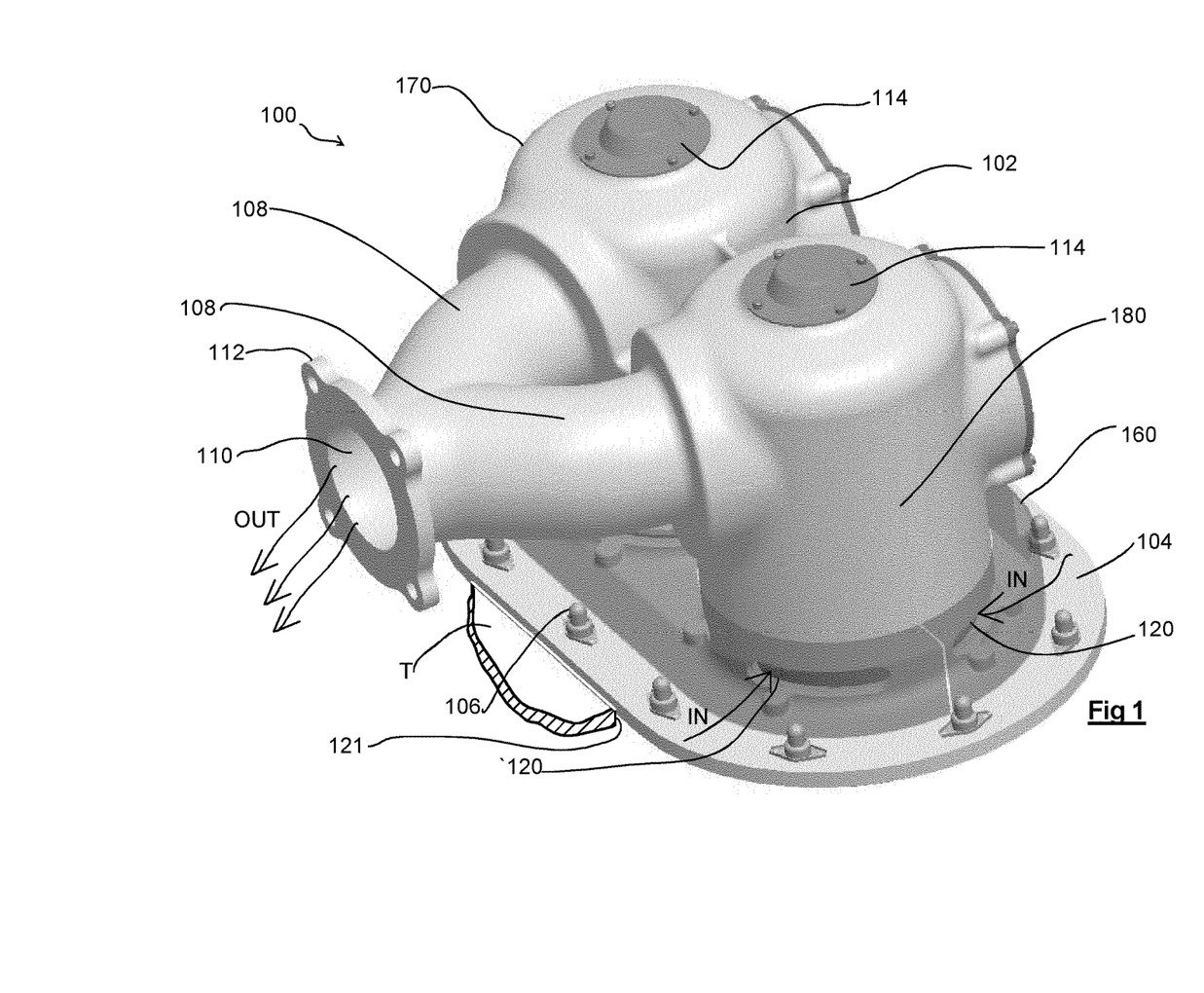
FIG. 1 shows a perspective view of a first embodiment of a fuel pump arrangement.
Figure 2:
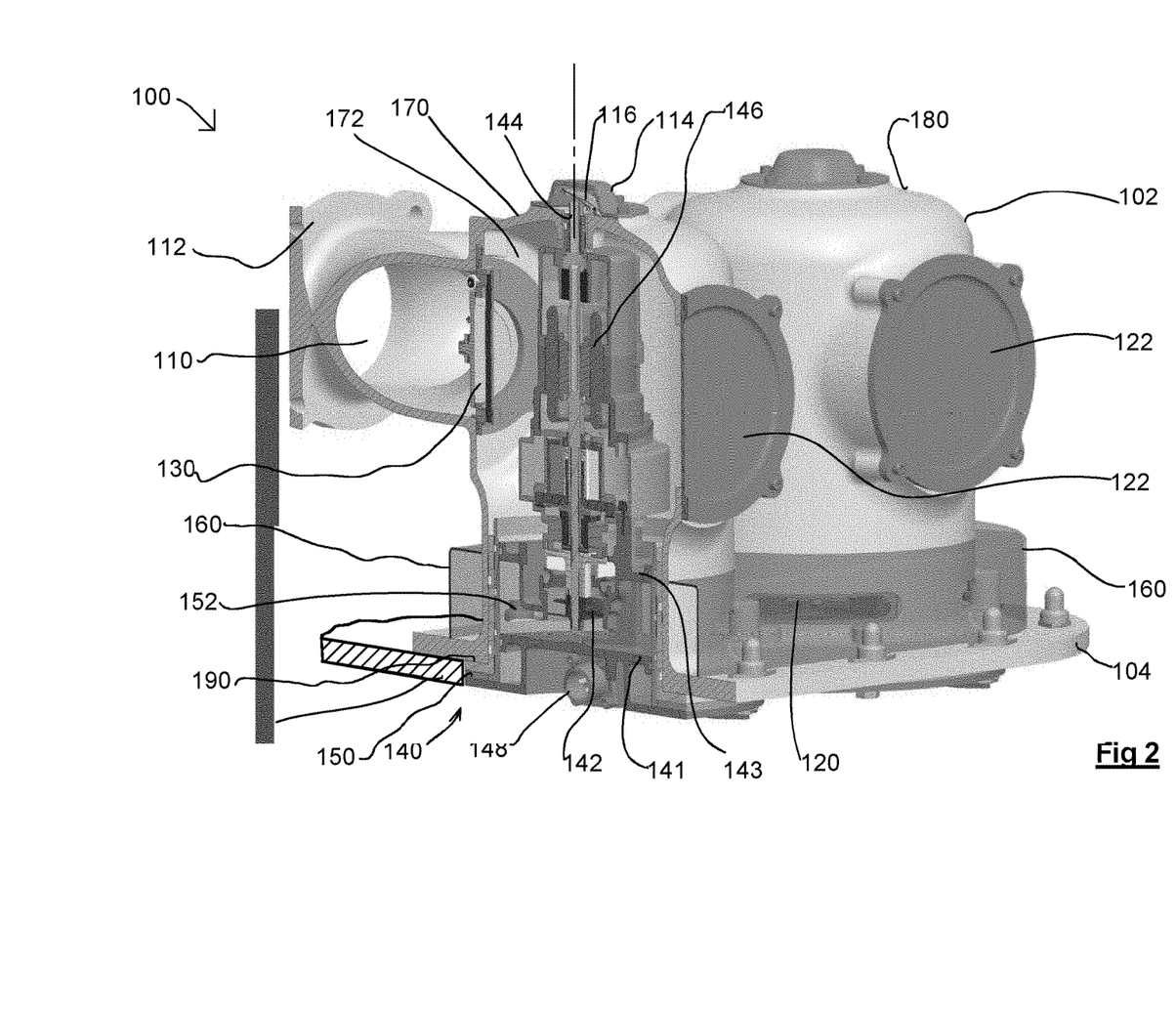
FIG. 2 shows a further perspective view of the fuel pump arrangement shown in FIG. 1, in section.

Referring to the FIG. 1, there is shown a fuel pump arrangement 100 comprising a plastics molded housing 102 in this case manufactured from PEEK plastics reinforced with approximately 30% short carbon fibers. The housing 102 includes a flange 104 for mounting adjacent an aperture 121, one edge only being illustrated, in the base wall T of a fuel tank. Captive nuts 106 are, in this case, bonded by means of adhesive to the flange 104 to provide, along with complementary bolts, a securing means for mounting housing. The aperture 121 is provided in the wall T of the base of the fuel tank, with the flange 104 sealing the aperture 121 by surrounding the aperture 121. The housing 102 sits generally inside the tank wall T, such that fuel can enter the housing 102 via inlets 120 which are located behind a strainer 160. Fuel can travel in the directions of arrows "IN" and exit the housing via an outlet 110 in the direction of arrows "OUT". The outlet 110 includes a flange 112 for connecting to a fuel line. In this arrangement 2 fuel pumps are housed within cavities referred to herein as canisters. 170 and 180. Each fuel pump has an outlet manifold 108 supplying the common outlet 110. Only one aperture 121 in fuel tank wall T is required for, in this case, two pumps FIG. 2 shows a section through the canister 170. In this drawing an electrically driven fuel pump 140 is shown, located within a canister cavity 172 formed by the canister 170. In this application, the 'term fuel' pump means at least the pump parts able to produce fluid flow. In use, electrical power is provided at a socket 148 for driving a pump motor 146. The pump 140 has a shaft 144 which rotates about an axis A, to drive a helical impeller 142. The impeller 142 draws in fuel from the tank T, through the strainer 160, through the inlet 120. The impeller 142 forces fuel out of the cavity 172, through a valve 130 and out of the outlet 110. Thus, the pump 140 sits generally in the cavity 172 which in use is flooded. A vapor discharge valve 114 allows vapor to escape from the cavity 172. The pump shaft 144, in situ, raises a vapor discharge flap 116, to allow vapor to escape.

The pump 140 is located within the housing 102 by means of an outer cylinder 190 and a closure member in this case in the form of a slideable slide valve 150. Both the cylinder 190 and the slide valve 150 include apertures which are aligned with the inlets 120, such that the apertures allow fuel to flow to the pump 140. The pump has a pair of wall elements 141 and 143 which hold the pump radially in place in the slide valve 150. An identical pump arrangement is housed within the second canister 180. The pump arrangement 100 also includes blanking plates 122 for access to the fuel tank via the cavity.

Figure 3:
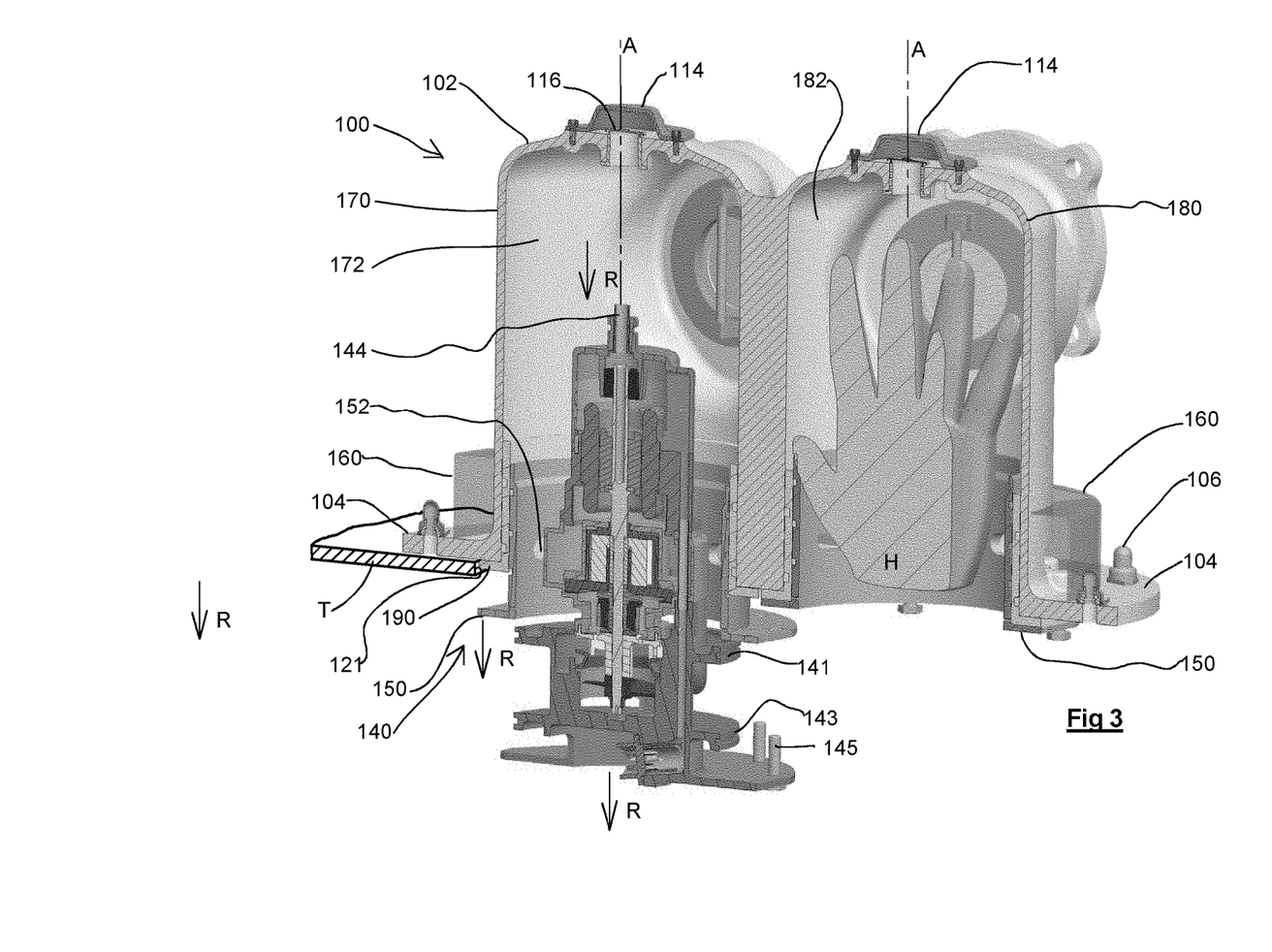
FIG. 3 shows a further perspective view of the fuel pump arrangement shown in FIG. 1, in section and shown a partially withdrawn fuel pump.

Referring additionally to FIG. 3, when it is required to remove the pump 140 from the canister 170 or the canister 180, this can be done by withdrawing the pump 140 in the direction of arrow R, away from the tank T. Securing screws 145 are removed and the pump can be pulled manually. At the same time, the slide valve 150 is pulled with the pump a predetermined distance in the direction of arrow R such that its apertures 152 no longer coincide with the inlets 120, and so the cavity 172 becomes isolated from the fuel tank T. A bayonet type fitting allows initial movement of the pump 140 and slide valve 150 in the direction of arrow R, until the slide valve isolates the cavity, then by twisting the pump, it can be separated from the slide valve and removed. Further, the pump shaft 144 no longer holds open the vapor discharge valve flap 116. So, the cavity 172 is further isolated from the tank T before the pump is removed. In FIG. 3, the pump 140 is shown partially removed from the cavity 172 and a further cavity 182 within the canister 180 is shown with the pump fully removed. Additionally, a hand H is shown within the cavity 182 to illustrate that access to the cavity is possible when the pump is removed. For clarity, the slide valve 150 shown within cavity 182 is not withdrawn in the direction of arrow R, however, in practice, the slide valve 150 will be withdrawn as shown to the left of the drawing, unless the fuel tank T has been drained.

Figure 4:
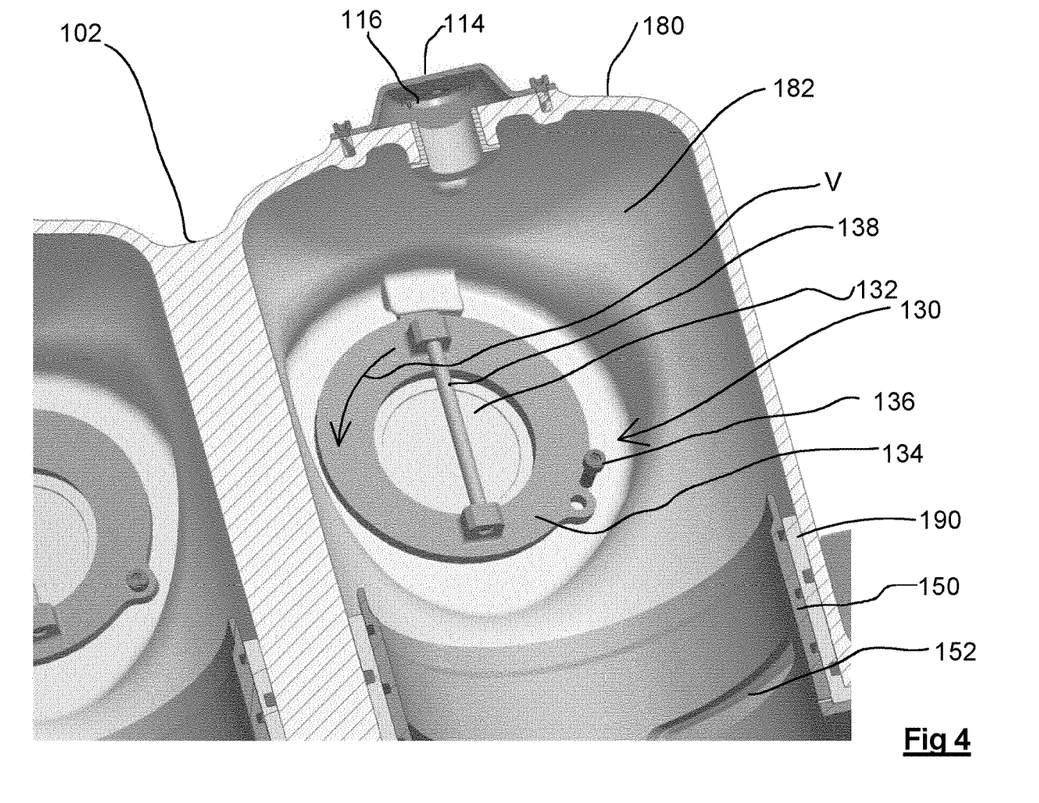
FIG. 4 shows a further partial perspective view of the fuel pump arrangement shown in FIG. 1, in section with fuel pumps withdrawn.

FIG. 4 shows a section through the housing 102 illustrating the non-return valve 130 in more detail. Should it be necessary to repair or overhaul the valve 130, this can be done by accessing the cavity 182, after draining the tank T. A single securing fixing 136 can be removed, and a guide plate 134 is rotated in the direction of arrow V to remove a valve flap 132 and valve stop 138 as an assembly together with the guide plate 134. This drawing shows the mounting cylinder 190, slide valve 150 and apertures 152 in more detail.

Figure 5:
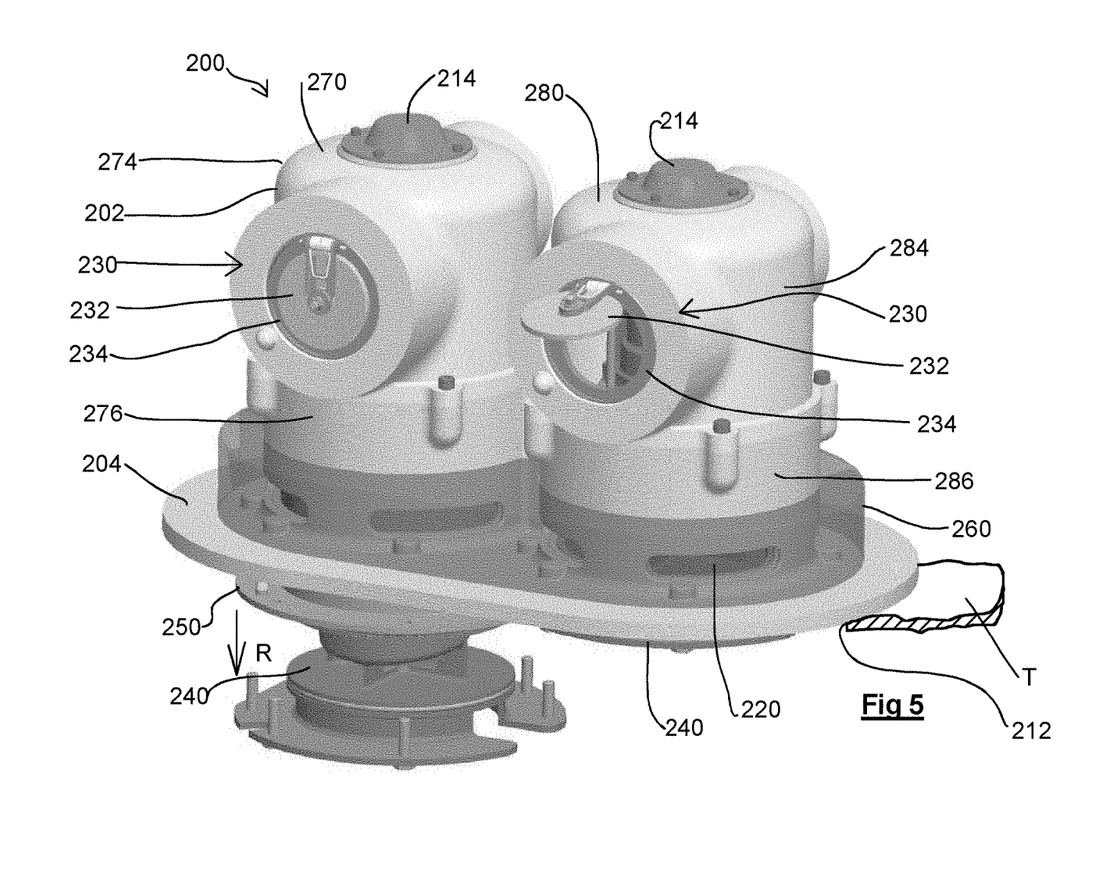
FIGS. 5-6 show different perspective views of a second embodiment of a fuel pump arrangement.
Figure 6:
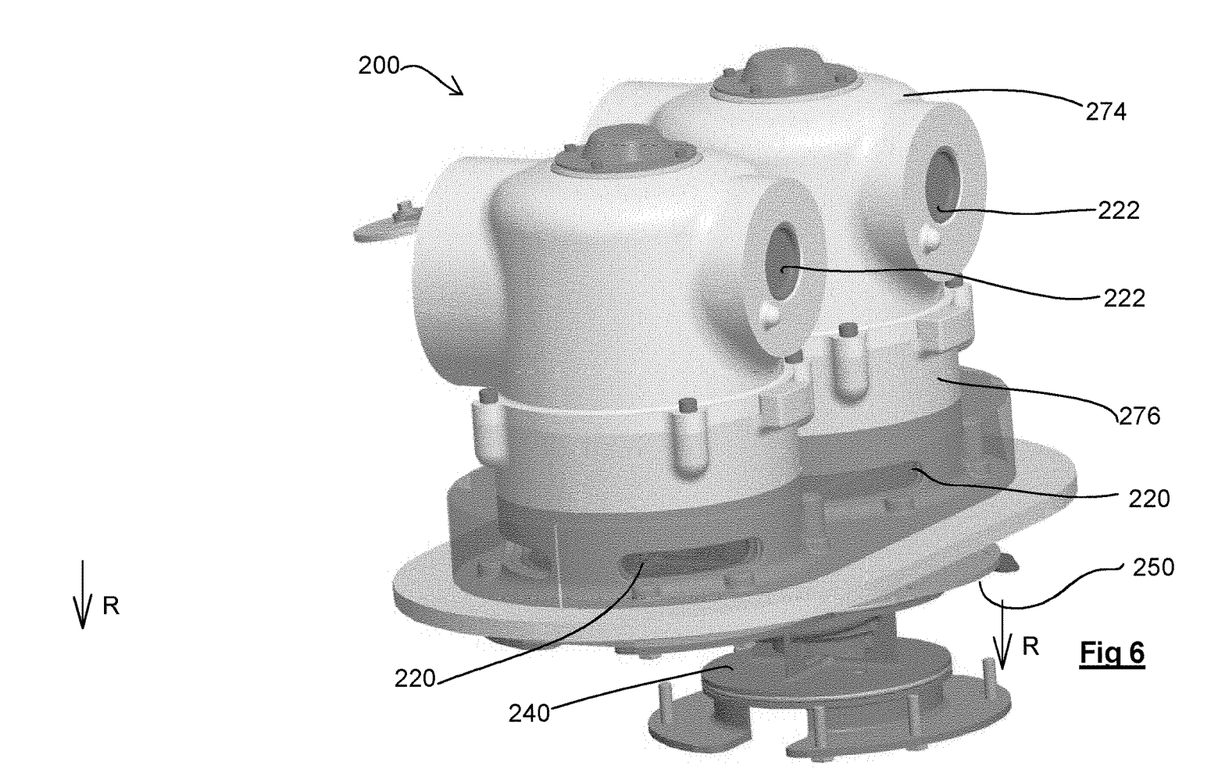

FIGS. 5 and 6 show different views of a second embodiment of the invention. In this embodiment parts similar in function to the embodiment shown in FIGS. 1-4 have references sharing the last 2 digits.

A pump arrangement 200 is shown which again includes a housing 202. The housing includes a flange 204 which is intended to be bonded directly to either the wall T of a fuel tank, or an aircraft structure supporting the fuel tank, in either case, having an aperture 212, only one edge of which is illustrated. The construction of the fuel pump arrangement 200 is similar to the construction of the fuel pump arrangement 100, except that two outlets 230 are provided, for connecting to appropriate fuel discharge lines. In this case, the canister 270 and the canister 280 are formed from separate upper portions 274, 284 and lower portions 276, 286, which are held together by means of fixings.

In FIGS. 5 and 6, one of the two pumps 240 used is shown partially removed from its canister 270. The pump removal technique is as described above, in that a slide valve 250 is also partially withdrawn in the direction of R such that inlets 220 are obstructed to isolate the respective canister cavity 272, 282 from the tank T.

Figure 7:
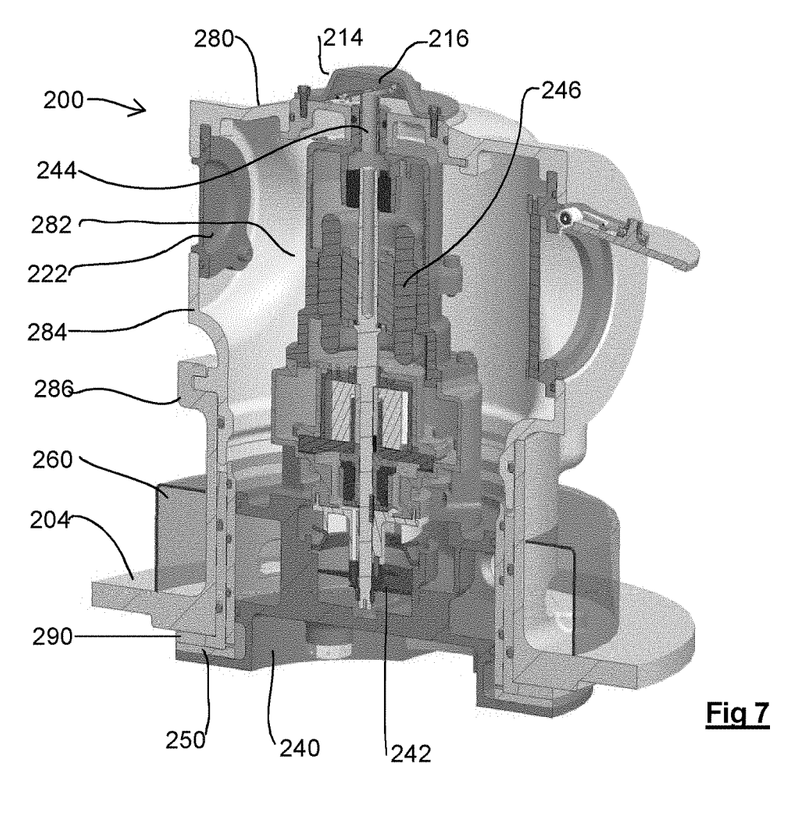
FIG. 7 shows a further perspective view of the fuel pump arrangement shown in FIGS. 5 and 6, in section.
Figure 8:
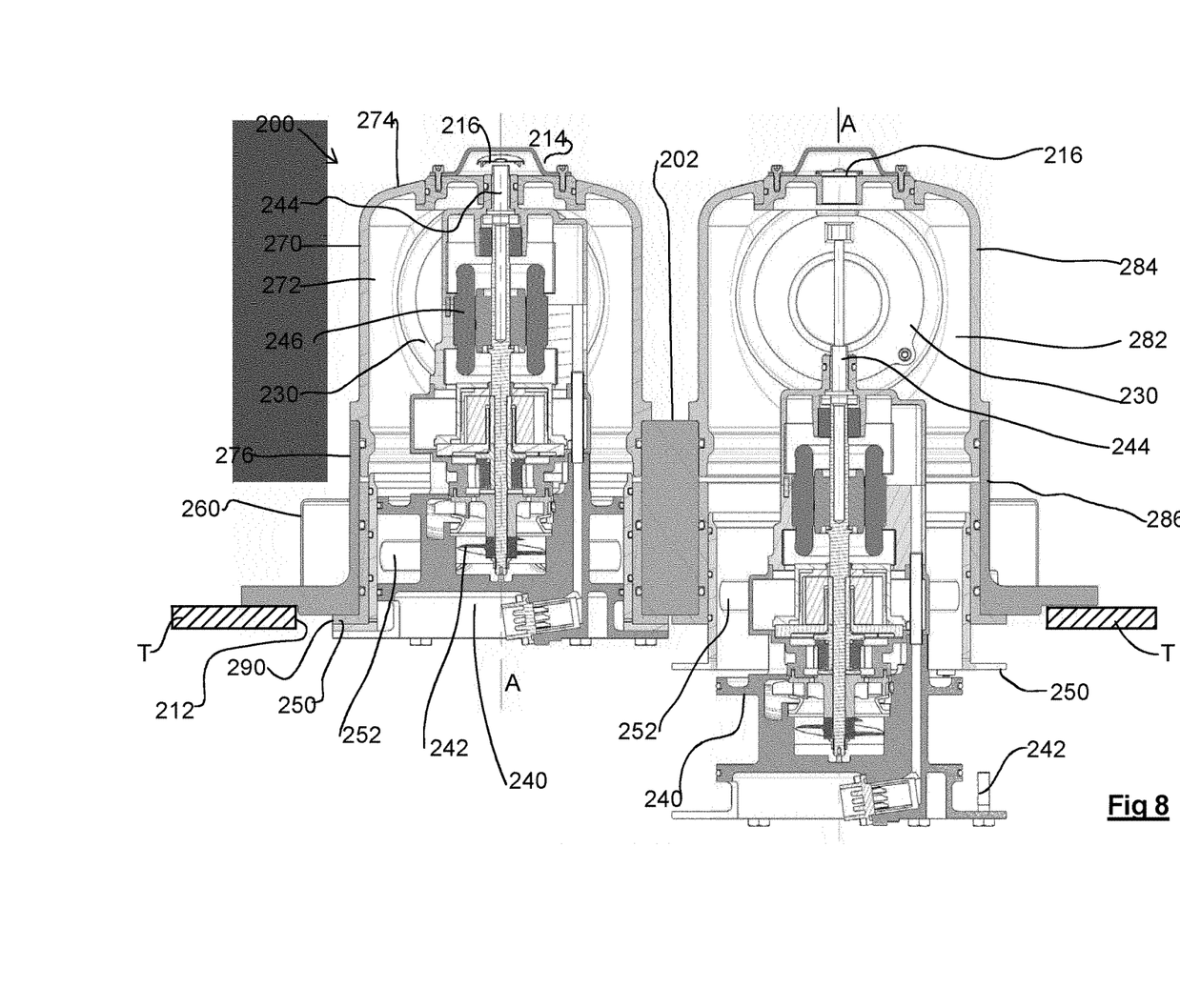
FIG. 8 shows a sectional view through the arrangement shown in FIGS. 5 and 6 with a fuel pump partially withdrawn.

Referring to FIG. 7 there is shown a section through the canister 280. The arrangement shown in FIG. 7 will be identical within the canister 270. The canister 280 includes the internal cavity 282 which functions in the same manner as described with reference to FIG. 2. Referring to FIG. 8, the withdrawal of one pump 240 from the cavity 282 is illustrated, together with the pump 240 within cavity 242 remaining in situ. The withdrawal of the pump in the direction of arrow R is as described above with reference to FIG. 3.

Figure 9:
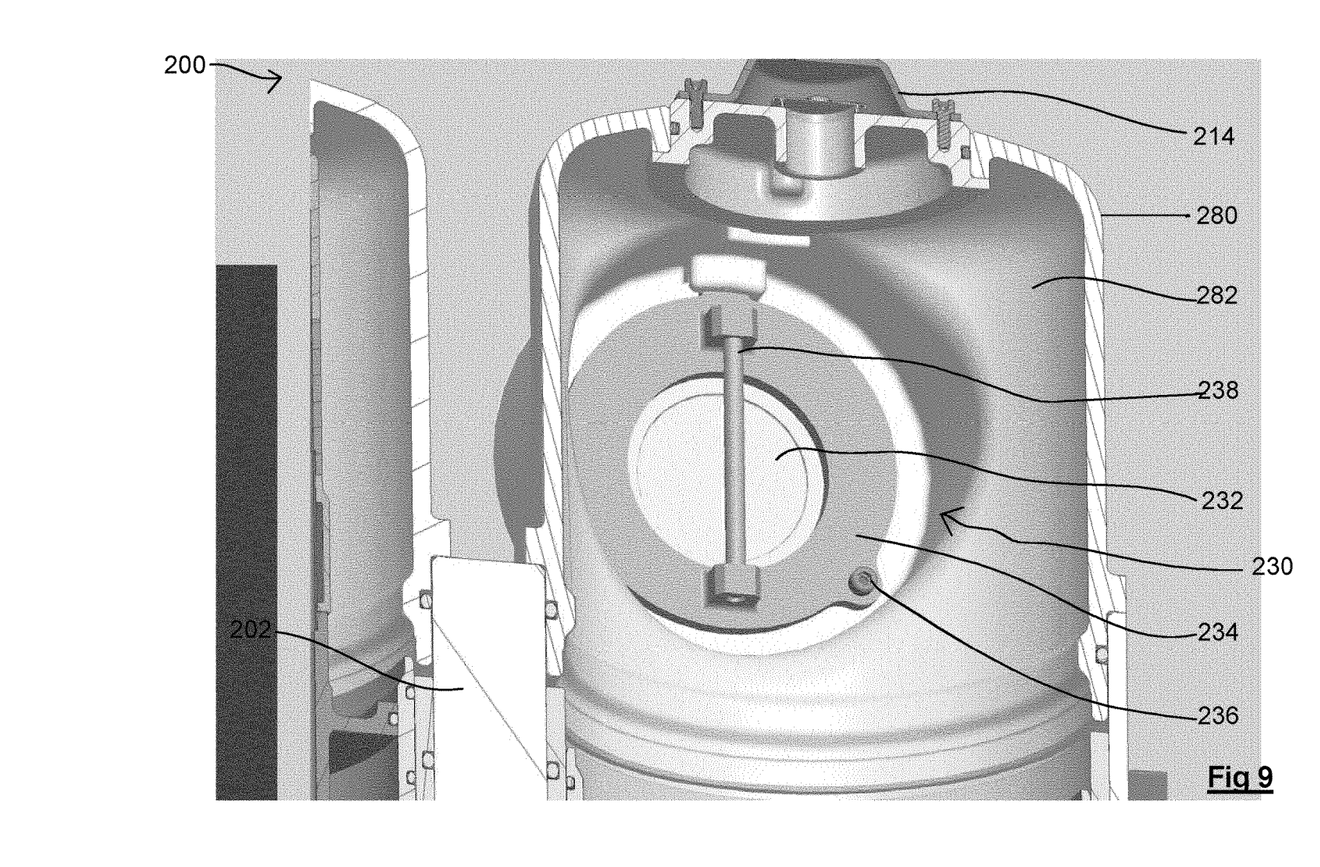
FIG. 9 shows a partial section of the arrangement shown in FIGS. 5 to 8.

With reference to FIG. 9 removal of the non-return valve 230 is as described above, with reference to FIG. 4, and employs a bayonet type removal mechanism, for removal of the valve from within the respective cavity 272, 282 when the tank is drained. In this embodiment vapor discharge valve 214 can be removed in the direction of arrow R once pump 240 has been removed. Removal of the non-return valve 230 and the vapor discharge valve 214 can be performed after the tank T has been drained.

Two embodiments only of the invention have been described and illustrated, however, various modifications, additions or omissions will be apparent to the skilled addressee, without departing from the scope of the invention. For example, the pump arrangements shown employ two pumps, but any number of pumps could be used.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A fuel pump arrangement for mounting in or adjacent an aperture in a wall of a fuel tank, the arrangement comprising:
    a housing comprising a first cavity and a second cavity arranged side by side, the first cavity having a first axis extending generally perpendicular or obliquely to the wall of the fuel tank, a first fuel inlet disposed in a side of the first cavity, and a first slide valve comprising a first sleeve including a first sleeve aperture that, in use, coincides with the first fuel inlet, the first slide valve being displaceable along the first axis, and the second cavity having a second axis extending generally perpendicular or obliquely to the wall of the fuel tank, a second fuel inlet disposed in a side of the second cavity, and a second slide valve comprising a second sleeve including a second sleeve aperture that, in use, coincides with the second fuel inlet, the second slide valve being displaceable along the second axis;
    a first fuel pump disposed in the first cavity; and
    a second fuel pump disposed in the second cavity,
    wherein withdrawal of the first fuel pump out of the first cavity displaces the first slide valve along the first axis such that the first sleeve obstructs the first fuel inlet so as to isolate the first cavity from the fuel tank, and
    wherein withdrawal of the second fuel pump out of the second cavity displaces the second slide valve along the second axis such that the second sleeve obstructs the second fuel inlet so as to isolate the second cavity from the fuel tank.

2. The arrangement of claim 1, wherein each cavity includes an outlet including a non-return valve.

3. The arrangement of claim 2, wherein each non-return valve includes a valve flap and guide plate supporting the valve flap on the housing.

4. The arrangement of claim 3, wherein the guide plate is held in place by a removable fixing, and
wherein the guide plate is rotatable for dismantling when the removable fixing is removed.

5. The arrangement of claim 4, wherein the removable fixing comprises a single fixing.

6. The arrangement of claim 2, wherein each non-return valve is withdrawable from its respective cavity using access from that respective cavity once that cavity's respective pump has been removed.

7. The arrangement of claim 1, wherein the housing is comprised of fiber-reinforced plastic.

8. The arrangement of claim 7, wherein the fiber-reinforced plastic comprises PEEK that is reinforced with 20% to 35% carbon fibers.

9. The arrangement of claim 1, wherein the housing further includes a mesh strainer formed around the fuel inlets, externally of the housing.

10. The arrangement of claim 9, wherein the housing is comprised of a fiber-reinforced plastic, and
wherein the strainer is bonded to the plastic of the housing.

11. The arrangement of claim 1, wherein each cavity includes a vapor discharge valve located in the housing.

12. The arrangement of claim 11, wherein each vapor discharge valve is removable from within its respective cavity when the respective pump is removed from the respective cavity.

13. The arrangement of claim 1, wherein the housing further includes a flanged base portion for securing the housing to, or adjacent, the wall of the fuel tank,
wherein the flanged base portion surrounds the first and second cavities, and
wherein the first and second cavities are accessible from outside of the fuel tank, and allow removal of the first and second cavity's respective pumps from outside the fuel tank.

14. The arrangement of claim 1, wherein the housing is adhesively bonded or bondable directly to the fuel tank or a fuel tank supporting structure.

15. The arrangement of claim 1, wherein rotation of the first fuel pump after the first slide valve obstructs the first fuel inlet separates the first fuel pump from the first slide valve, and
wherein rotation of the second fuel pump after the second slide valve obstructs the second fuel inlet separates the second fuel pump from the second slide valve.

16. A method of servicing the fuel pump arrangement of claim 1, the arrangement being disposed at least partially within the fuel tank, the method comprising:
disposing one of the fuel pumps in a respective one of the cavities of the arrangement;
partially withdrawing the one fuel pump from the respective cavity together with the slide valve of the one fuel pump; and
withdrawing the one fuel pump fully from the respective cavity leaving the slide valve to isolate the cavity from the fuel tank.

17. The method of claim 16, further comprising draining the fuel tank then removing any one or more parts of the fuel pump arrangement including the slide valve, a non-return valve, and a vapor discharge valve, from the fuel tank and the respective cavity using access to the cavity from the outside of the fuel tank.

* * * * *